ELECTRICAL CONNECTOR

Filed Oct. 21, 1965

INVENTORS
HERBERT P. BYRNES
LOUIS J. GAGLIANO
HENRY C. SCHICK

BY J W Armbruster
ATTORNEY

United States Patent Office 3,400,358
Patented Sept. 3, 1968

3,400,358

ELECTRICAL CONNECTOR

Herbert P. Byrnes, Wappingers Falls, Louis J. Gagliano, Poughkeepsie, and Henry C. Schick, Hopewell Junction, N.Y., assignors to International Business Machines Corporation, Armonk, N.Y., a corporation of New York Filed Oct. 21, 1965, Ser. No. 500,127
6 Claims. (Cl. 339—17)

ABSTRACT OF THE DISCLOSURE

A small plug-in connector of the banana plug type is composed of two outwardly bowed wire halves which are welded together at both ends and rounded at one end to be inserted into small printed circuit through-holes. When such wires are of half round cross-section and welded with flat faces together at ends of bowed lengths, the resulting connector is unusually strong and flexible and yet suited to be fitted into smaller holes than ordinary wire or spring strip stock plugs. A single plug may be formed with more than one bowed section to pass through and connect several circuit boards or components. The simplicity of the joined wire halves makes the connector subject to continuous processing through several joining, shaping and plating steps in an economical fashion.

This invention relates to a plug-in type of connector for joining components and printed circuit boards related to electrical and electronic devices and it is more particularly concerned with the type of connector characterized as bayonet or banana plugs comprising flexible expanded metal shapes which are compressed when inserted in openings such as through holes plated in printed circuit boards or similar socket receivers.

In many instances concerning connections of electronic devices it is advisable to have small extensions on one device make contact by being inserted into another device. Such plug-in instrumentalities often take the form of pins and receiving spring leaf contacts. However, the cost of making and mounting such solid pins and spring leaves is often high and a further disadvantage resides in the size of such instrumentalities which makes them not altogether suitable for use in connection with small and delicate parts. The idea of the present advance is to provide small economical and yet rugged plug-in type connectors suitable for assembly in rather small plated through hole sockets. Heretofore, banana type plug-in connectors of small size usually utilized a bent wire type of device comprising an ordinary wire of circular cross-section which was bent in an oval for obtaining contact pressure and such devices were not only difficult to manufacture but also presented a prestressed condition because the lower end of such a contact was almost always bent back upon itself and since it was usually of a non-ferrous good conductivity metal, it had very low mechanical strength. Therefore, the bent wire type of plug-in connector has not been altogether satisfactory and it is for such reasons that the present half round cross-section type of wire is advanced as a superior product. In the present instance, two half round wires are brought together with the flat faces facing and welded at separate points and cut off beyond the welded points and then compressed to produce a bulging effect to spread two of such wires apart and thus form a bow configuration of separated half round wires that have no inherent stress as in the case of the loop wire. Other advantages of the half round cross-section of the wire element is that they are selfcentered and more easily attached to fit within soldered connections and also to be attached separately with a flat face of the half round engaged against one welded connection. Further features of this half round wire formation resides in the fact that they are operable in connection with smaller sockets or plated holes and printed boards and their formation as being pre-deflected also results in better wiping contact. Further features reside in the fail safe angle wherein a plug can be fully compressed and in such fully compressed form merely conforms to the outline of a corresponding socket hole without deforming such a hole, and in such plugging operations this type of teardrop contact accommodates misalignment of cooperation between the two parts. There are also two manufacturing advantages in that the stock is usable in a continuous form and more easily aligns oppositely to be welded when brought in a facing condition and the fact that the half round construction is of a cross-section having greater strength than other formations makes it economical in that less material may be employed and handled.

The primary object of our invention is to provide a more compact meeting half round pair of joined wire connectors of teardrop form that can be made of economical metal of good conductivity and which lends itself to simple manufacturing techniques and has sufficient mechanical strength for providing the necessary flexibility to accomplish the needed mechanical contact pressure within a socket.

The novel plug-in connector is composed of a pair of facing half round wires which could be of a copper alloy material joined at two ends by a fastening or by welding or by other joining means. Pressure of the two ends causes the wire centers to bulge or bow outward into an oval formation which has sufficient resilience to establish good electrical connection with a smaller aperture when inserted therein. Since the two strands are bowed outwardly they are forced towards a center line when being plugged into a socket having a diameter which is less than the width of the bowed strands or so small as to merely be equal to the sum of the two half rounds of wire dimensions, and there will be mechanical stresses set up in the bowed halfs causing a strong contact engagement with respect to the internal surfaces of the socket connector.

Although half round wires are mentioned predominantly herein, it is to be realized that varieties of wire cross-section areas approximating that of a half round arcular type are considered equivalent and have many of the same advantages.

A novel method of manufacture involving the paired half-round wires of the invention, is to bring together two such wires with the flat faces adjoining and run such an elongated pair together through a series of stations for welding, stripping, cutting, bulging, radiusing, cleaning, heat treating, cleaning and plating operations; all steps calculated to provide a smaller more reliable but economical form of plug-in teardrop connector.

It is apparent that a main object of our invention is to provide an improved flexible pressure type of plug-in connector.

Another object of our invention is to provide a novel plug-in connector which is formed of a pair of compression yielding bows of wires of half round cross-section with the flat faces of such wires facing inward to be welded together firmly at two ends and the center of the pair being compressible to the shape of a perfect circle of small diameter, even as small as the composite girth of the two half round wires before they are bowed outward to provide resilient wiping contact. In the miniaturization of electrical components it is a decided advantage to be able to use socket holes of very small diameter to save space which is ordinarily wasted in order to take the forms of plug-in connectors available through the designs of the prior art.

A further object of our invention is to provide a novel method of manufacture of plug-in connectors wherein the plurality of continuous half round wires are directed through a number of successive stations for welding and cutting and bulging as well as heat treating and plating with a coating such as gold which has excellent characteristics for establishing good electrical contact as well as preventing tarnishing. Although the usual method of manufacturing comprises the production of separate units each involving a single bulging pair of wires, it is contemplated that any number of such bulging formations may be preserved in a full length of uncut material to provide a connector adaptable to connect two or more socket holes as well as the holder of one end of the composite bowed plug-in connector.

Other objects, features and advantages of the invention will be apparent from the following more particular description of preferred embodiments of the invention, as illustrated in the accompanying drawings.

The gist of the invention resides in the assembly of a pair of half round wires arranged with the flat faces thereon facing and contacting at a pair of spaced welded points. Afterwards the intermediate portions of the half-round sections are bowed so that they provide intermediate flexible and resilient portions adapted to be inserted in a socket and act to establish good electrical contact therein. Among the advantages of such a mated half round construction, is that it can be made for very small diameter holes and does not have an inherent stress factor (such as exists with a loop of the prior art) and it can be designed such that overstressing cannot occur even in the fully compressed condition. Furthermore, it is very well suited for mounting in round holes and designed to be fail-safe in many applications. Moreover, it can be processed in a continuous series of one or more contacts and when mounted can also accept considerable misalignment and yet establish excellent electrical conductivity between two or more parts. The present connector construction differs from the ordinary loop type banana contacts in that it is in reality composed of a pair of pre-deflected beams which approximate a condition of being fixed at both ends. A wiping and pressure induced electrical contact is made at the best suited location at an intermediate section of the bowed beams so that a uniform pressure is exerted outwardly against a socket wherein they are arranged. The detailed manner of operation of this contact is one of combined deflection of a beam and a rolling-closing action at the beam extremities. This yields a self-adjusting effect and therefore large hole tolerance capabilities.

Figure 1:
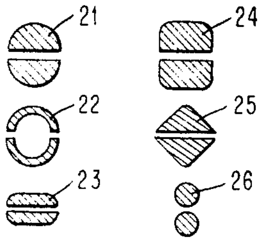
FIG. 1 is a sectional view of a series of paired wires showing several possible cross-sections with the advantages pointed out specifically herein with greater emphasis on the half round variety. Other variations shown are rectangular, half round, shell, segmental triangular, flat rectangular and regular round sections.
Figure 4:
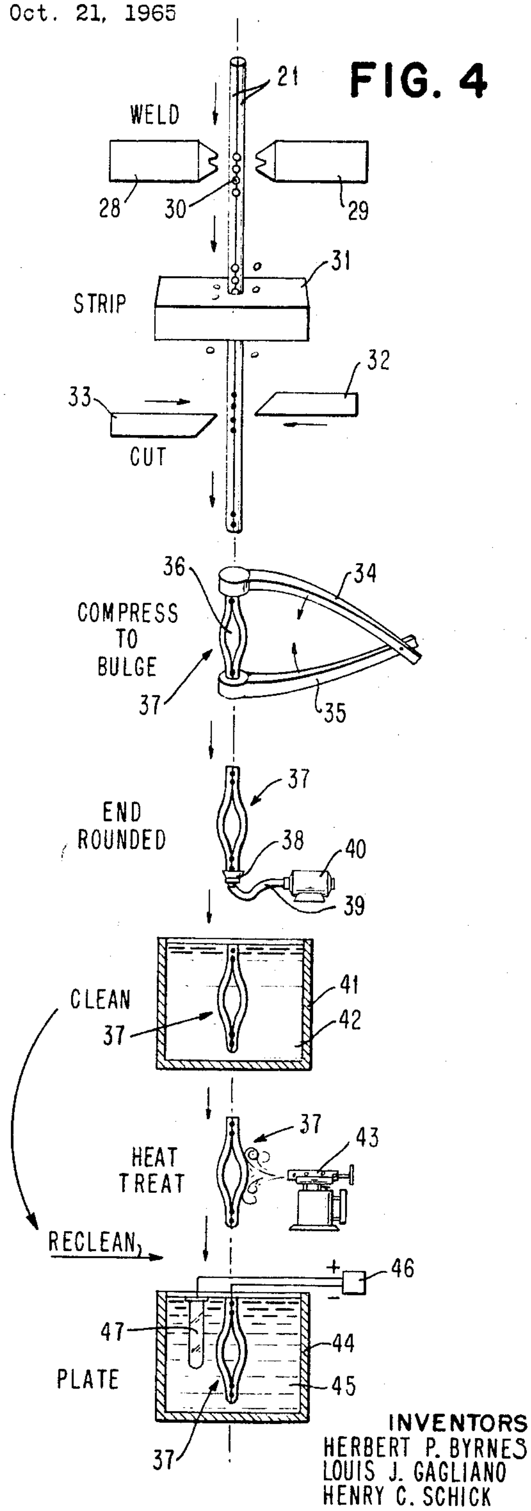
FIG. 4 is a vertical diagrammatic showing illustrating the various steps in the manufacturing procedure for making the novel plug-in type connector.

Referring to FIG. 1 it is noted that several varieties of cross-section differences are contemplated for the pairs of wires to be joined and formed as flexible plug-in contacts. The preferred form of the double half round configuration 21 is shown at the upper left hand corner of the figure and in conjunction with five other varieties of such pairs of wires, a second variety is that of reference character 22 showing a pair of half round shell sections which may be joined advantageously and operate with some of the favorable characteristics of the half round variety 21. The third form 23 is a rather flat, rounded rectangular paired construction which is also favorable in the instances of narrow hole openings. A fourth variety is more of a square or wide rectangular paired formation 24 for use wherever ample space is provided. A fifth form is that of a triangular or segmental style of wire 25 where the two flat facing portions of a cross-section are the base of equilateral triangles or any other triangular form having one apex and rounded edge. The final round wire variety 26 is shown and has some of the advantages when formed as illustrated in FIG. 4 to be joined and bowed in the same manner as the half round variety 21. The round wire 26 is often found in prior art structures but there the wire is merely bent into a continuous bow and not formed in the fashion disclosed herein.

FIG. 4 is a diagrammatic showing of the method of production of the plug-in contact and illustrates a series of steps extending from the top to the bottom in a sequence of operations changing the ordinary facing pair of half round wires 21 into a useful plug-in type resilient contact. At the top of FIG. 4 it is assumed that there is some mechanism, not shown, for holding and feeding the pair of half round wires 21 downward in a series of steps calculated to bring the various portions of the joined wires to and through the various stages, in synchronism so that several operations may take place at the same. time. Starting at the top of FIG. 4 it is seen that the first station encountered is the one provided for welding the wires together. There it is noted that electrodes 28 and 29 face on opposite sides of the wires and are provided with double pointed welding points which provide closely spaced but separate joining points. The reason for this being that two closely spaced welds provide a safe redundant tie-point of the two wires halves at each end of the beam to be subsequently formed. In a later station the wires are to be severed somewhere between every other two pairs of welded points and thus remain intact at both ends. The wire continues downward and passes through a second station which is a stripping station having a fixed die form 31 which is a hardened block having sharp circular corners for stripping off any excess material caused to bulge beyond the diameter of the wires while welding took place.

The third station is a cutting station where a pair of oppositely facing cutting bars or shearing instruments 32 and 33 are suited to be brought together against the wire and overlapping in opposite directions to shear off a length of adjoined wires suitable in size for making the desired length of paired wire with an unattached center and extended end. All of this cutting operation is shown as happening invariably for each bulging section. It is noted in connection with FIG. 3 that there may be some formations wherein the cutting operation is skipped for two or more cycles of operation in order to provide an elongated form of plug-in contact having more than one bulging section.

It is to be realized that in connection with the series of stations shown in FIG. 4, that other holding, guiding and directing instrumentalities may be furnished by the average mechanic skilled in the art and are therefore eliminated to enhance the clarity of the diagrammatic showing in FIG. 4.

The fourth station of operation includes a pair of compression arms 34 and 35 for enveloping the ends of the plug-in unit 37 so that the arms may be brought together to compress and bulge the unit and form an opening 36 between the two half round wires so that there is a bow formation created with the resilience necessary for plugging into socket openings with some compression being exerted to tend to close the two bowed wires. In forming the bow, a very thin spreader bar may be inserted between the contact halves just before bowing takes place, to assure that each half bows outwardly.

Since the plug-in contact 37 is designed to be used in conjunction with rather small socket openings and to compensate for any misalignment, therein, it is desirable that the pointed end of the lower end of the contact should be made rounded or tapered in order to find its way into any socket opening. The formation of this rounded lower end is the purpose for the fifth step in the sequence of operations. There it is seen that a motor 40 is provided with a flexible shaft 39 and has on the rotating end, a grinding wheel or cutter 38. The grinding wheel 38 is formed with an inner cup depression formation which is suited to take off the sharp circular corners on the lower end of contact 37 in order to round, taper or chamfer the inserting end of the contact. In another variation of this operation, the contacts may be rotated relative to a grinding wheel.

The sixth station illustrates in a diagrammatic fashion a cleaning operation. There it is noted that the contact 37 is submerged in a cleaning fluid 42 held in a tank 41. This is to be realized as merely illustrative since a cleaning operation would usually be carried on in conjunction with agitation of either the article or the cleaning fluid 42 which may be the usual chemical hydrochloric acid. Another cleaning operation may follow heat treating or any of the other steps.

After passing through the sixth station, the contact 37 is brought into a heat treating station where a heater 43 applies a flame to the contact. Here it is also to be understood that there could be in conjunction with such a heat treatment some quenching in a fluid such as oil according to the nature of the alloy employed in the half round wires. Also it should be realized that rather than a flame, an oven may be employed.

The eighth step in cases where step number seven is employed, is another cleaning step similar to that in step number six.

The ninth and final station step in the process of FIG. 4 has to do with the provision of a protective coating on the contact 37 by passing a current from a power supply 46 between an anode 47 and the contact 37 to be plated and mounted as a cathode in a gold, chromium, tin, nickel, or other protective metal electrolyte 45 in a container 44. Plating can also be accomplished by means of barrel plating.

Figure 2:
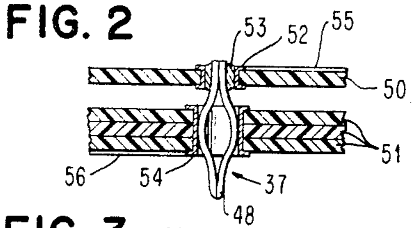
FIG. 2 is a sectional elevation view showing one of the plug-in connectors acting as an active module pin and extending from one module or circuit board and establishing contact with a through hole in a laminated or unlaminated second board.
Figure 3:
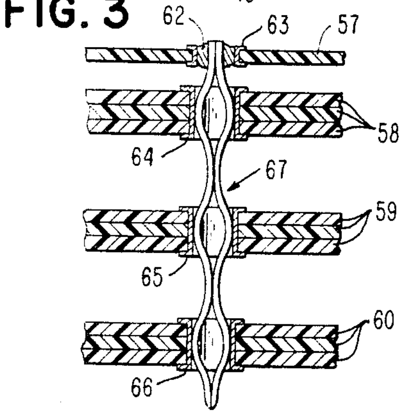
FIG. 3 is a sectional elevation view showing an extended length of teardrop plug-in connector type of formation wherein it is used in connection with a stacked printed circuit formation and the novel connector provides interconnection between several laminated boards.

After preparation as a plug-in unit, contact 37 is ready for use as an active module pin, a cross-over connector contact, an edge connector contact, or in connection with a stacked printed circuit board interconnector. The novel contact differs from the conventional loop banana plug type of contact in that it is in reality composed of a pair of pre-deflected beams which approximate a condition of being fixed at both ends, but joined to be pointed to find a socket opening. In FIGS. 2 and 3 a pair of examples are shown to illustrate types of mounting and usage.

FIG. 2 shows a single unit contact 37 fixed on a module or printed circuit board 50 to extend downward therefrom. Module or board 50 has a printed circuit configuration 55 extending along the board face from one plated through hole 52 and is in this hole that a solder connection 53 is established around the untapered end of contact 37 to hold it extending at a right angle to the lower face of the board. Contact 37 is shown as pressed into and establishing contact with another through hole plated cylinder 54 which is formed on a laminated printed circuit board 51 having still another printed circuit configuration 56 which is to be joined to the circuitry 55 found on the original board. The proportions of the cylindrical plating 54 and the outer bowed ends of contact 37 are such as to flex the contact inward and establish a tight reliable contact between the outer surfaces of the contact and the inner face of the plated through hole. With pluggable connections such as these, it is easy to realize that either of the boards 50 or 51 may be changed relative to the other and various combinations of circuitry are easily established by merely unplugging one from the other. Such combinations are often found in the electronic art and it is in this utilitarian usage that the novel contact 37 plays an important part. The rounded end 48 of the lower part of contact 37 and the body length 99 is so designed as to compensate for any misalignment especially in the instances when the plated through hole 54 is much smaller than the ones shown in FIG. 2 and in fact may be only slightly larger than the fully pointed portions of the contact 37 and also when hole center-to-center distances vary.

The usage of a multiple bow contact 67 is illustrated in FIG. 3. There it is shown that a multiple unit 67 is fixed on a printed circuit board 57 to extend downward therefrom. Board 57 has a printed circuit configuration, not shown, and also a through hole plated opening 63 wherein there is a solder connection 62 for holding the upper unrounded end of the contact 67. There it is held to extend downwardly and be receptive to two or more laminated or single plyboards 58, 59 and 60 and in each of the latter there is, respectively, the plated through holes 64, 65 and 66 which are designed to cooperate with the bulged portions of the multiple stage contact 67.

Figure 5:
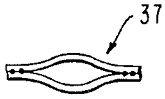
FIG. 5 is a detail view of a bowed plug in an "out of hole" condition.
Figure 6:
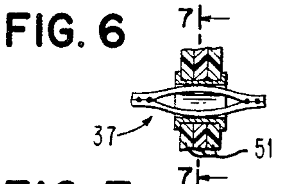
FIG. 6 is a detail view of a compressed plug in an "in hole" position.
Figure 7:
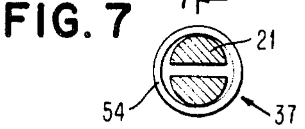
FIG. 7 is a cross sectional view taken along line 7—7 in FIG. 6 and showing how the half round wires appear inside a slightly larger socket or hole.

FIGS. 5, 6 and 7 show the contact in the unflexed, flexed and cross sectional appearances, respectively.

Although the contact is shown in FIGS. 2 and 3 as held as a fixed end on a printed circuit board is to be realized that other holdings may be established and the contact appear at the end of the wire or as a cable end or a plug tip or as incorporated in a multiple contact block. So also the receivers for this style contact may be other than printed circuit boards and plated through holes, such examples may include spring contacts and tubular terminals, clip receivers and circuit board edge notches or tabs.

It is to be understood that the wire stock may be fully or partially heat treated before forming and also possibly preplated before forming and thus allowing for the elimination of some steps in some instances.

While the invention is illustrated in connection with several embodiments it will be realized by those skilled in the art that the foregoing and other changes in form and details may be made therein without departing from the spirit and scope of the invention.

What is claimed is:

1. A male-type plug-in connector comprising a pair of wires fastened in intimate contact at their ends and at least one other point intermediate said ends, the sections of wire between the points of intimate contact being bowed away from each other in a teardrop formation, said teardrop formation being large enough to allow sliding contact with cooperating female-type sockets, said male-type connector having one end soldered into a plated thru-hole of a printed circuit board.

2. The male-type plug-in connector of claim 1 in which each of said wires is a half-round cross-sectional area and brought together with the flat faces facing so that the compressed connector may be inserted into a socket opening as small as, and substantially the same diameter as, a diameter of both wires together.

3. The male-type plug-in connector of claim 1 in which each of said wires is of a hollow shell half-cylindrical cross-section and brought together with pairs of edges facing so that the compressed connector may be inserted into a receiver opening of smaller width and diameter than the uncompressed pair of wire shells.

4. The male-type plug-in connector of claim 1 in which each of said wires is of a flat rounded edged rectangular cross-section and brought together with the flat faces facing so that the compressed connector may be inserted into a narrow receiver opening.

5. The male-type plug-in connector of claim 1 in which each of said wires is of rounded edged rectangular cross-section and brought together with flat faces facing so that the compressed connector may be inserted into a square receiver opening.

6. The male-type plug-in connector of claim 1 in which each of said wires is of a triangular cross-section and brought together with the flat faces facing so that the compressed connector may be inserted into a square or round receiver opening.

References Cited

UNITED STATES PATENTS

| | | | |
|---|---|---|---|
| Re. 25,798 | 6/1965 | Platz et al. | 339—252 |
| 2,064,545 | 12/1936 | Kleinmann et al. | 339—252 |
| 2,718,625 | 9/1955 | Harrison | 339—241 X |
| 2,752,580 | 6/1956 | Shewmaker | 339—252 X |
| 2,787,771 | 4/1957 | Francis | 339—252 X |
| 2,965,952 | 12/1960 | Gillett et al. | |
| 3,123,427 | 3/1964 | Yopp | 339—17 |
| 3,205,469 | 9/1965 | Frank et al. | 339—252 X |
| 3,163,588 | 12/1964 | Shortt et al. | 339—17 X |

FOREIGN PATENTS

| | | |
|---|---|---|
| 1,273,013 | 8/1961 | France. |
| 1,361,891 | 4/1964 | France. |
| 1,087,655 | 8/1960 | Germany. |

MARVIN A. CHAMPION, *Primary Examiner.*

PERRY TEITELBAUM, *Assistant Examiner.*